United States Patent [19]

Carlson

[11] 4,438,658
[45] Mar. 27, 1984

[54] ENGINE THROTTLE CONTROL

[75] Inventor: John A. Carlson, Conroe, Tex.

[73] Assignee: Capro, Inc., Conroe, Tex.

[21] Appl. No.: 330,595

[22] Filed: Dec. 14, 1981

[51] Int. Cl.³ .............................................. F16C 1/10
[52] U.S. Cl. .................................. 74/501 R; 74/523; 74/535
[58] Field of Search ................ 74/501 R, 501 P, 489, 74/491, 523, 535; 56/10.5, 10.8

[56] References Cited

U.S. PATENT DOCUMENTS

| 1,391,948 | 9/1921 | Gleodill | 74/501 R |
| 2,785,586 | 3/1957 | Schwerdhoffer | 74/489 |
| 3,036,476 | 5/1962 | Klepper | 74/501 R |
| 3,742,580 | 7/1973 | Sullivan, Jr. | 74/489 |
| 3,868,865 | 5/1975 | Neyer | 74/501 R |
| 4,170,151 | 10/1979 | Olson et al. | 74/501 R |
| 4,189,954 | 2/1980 | Nakamusa et al. | 74/501 R |

FOREIGN PATENT DOCUMENTS 26950 of 1904 United Kingdom .................. 74/489

Primary Examiner—Leslie A. Braun
Assistant Examiner—Anthony W. Raskob, Jr.
Attorney, Agent, or Firm—Jack R. Springgate

[57] ABSTRACT

A small engine throttle control which includes three molded plastic parts, two mating parts forming a housing and a third part, a lever pivotally mounted in side the housing and extending to the exterior thereof with a spring detent and rack structure between the lever and the housing to retain the throttle lever in any desired set position and with an enlarged ridge maintaining the throttle lever in idle position and preventing inadvertent stopping because such detent is larger and thus requires a positive force to move the throttle lever to stop position.

6 Claims, 4 Drawing Figures

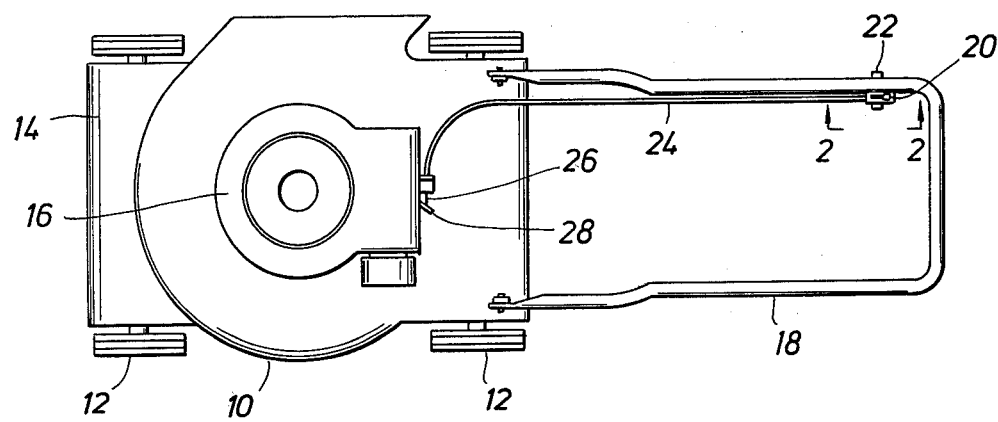
FIG. 1
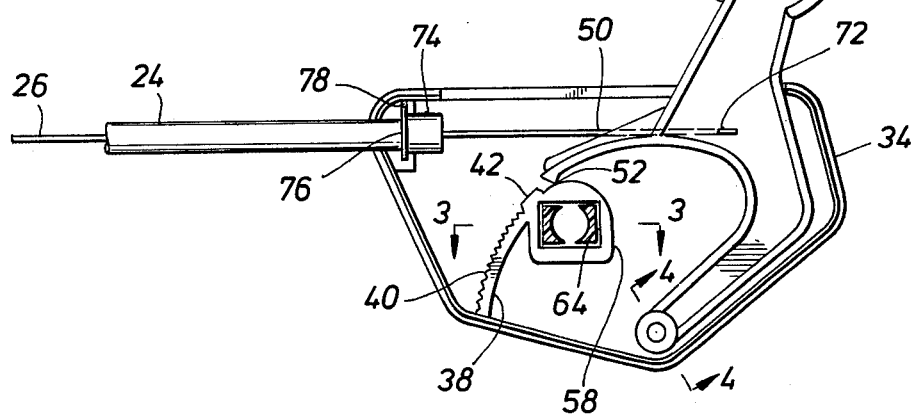
FIG. 2
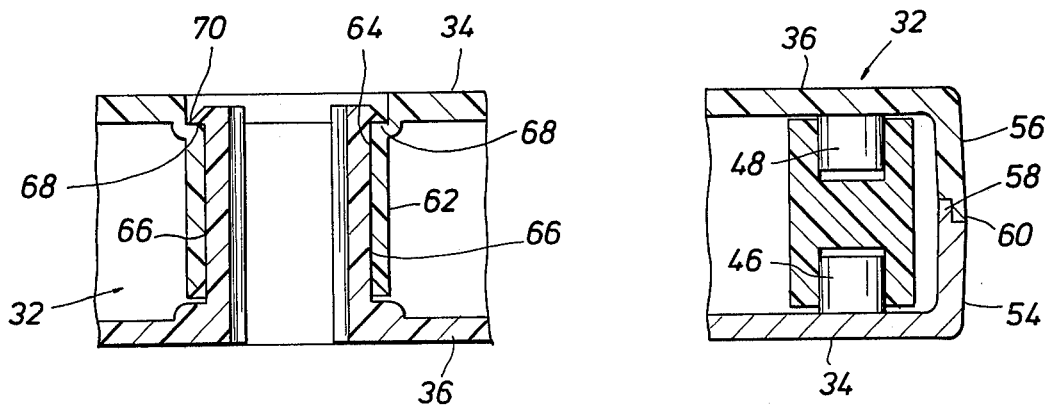
FIG. 3
FIG. 4

ENGINE THROTTLE CONTROL

BACKGROUND

Controls for relatively small and inexpensive engines, such as lawn mower engines, are usually mounted at a distance from the engine with connection to the engine throttle being made by a control wire sliding inside a conduit. It is desirable in the small engines that an efficient, inexpensive throttle control be provided and that such throttle control function efficiently to maintain the position of the throttle setting and to avoid inadvertent shut-off of the engine when it is desired that the engine idle.

My prior copending application Ser. No. 230,607, filed Feb. 2, 1981, is a continuation-in-part of my earlier filed application Ser. No. 157,374, filed June 9, 1980, now abandoned, discloses one type of throttle control for small engines which has particular application to throttle control for a lawn mower.

Another example of prior art throttle control is shown in U.S. Pat. No. 4,170,151. This patent discloses a small engine throttle control which includes a wire extending through a conduit, the wire having an off-set or z-shaped portion extending across a plastic rack with notches thereon and extending through a slot in the throttle control lever. The off-set portion of the control wire is urged into engagement with the rack to attempt to maintain the position of the throttle as set.

SUMMARY

The present invention provides an improved throttle control for a small engine such as a lawn mower, which control includes three molded plastic parts, two mating parts forming a housing and the third part a lever pivotally mounted inside the housing and extending to the exterior thereof with a spring detent and rack structure between the level and the housing to retain the throttle lever in its set position and with an enlarged ridge maintaining the throttle lever in idle position and preventing inadvertent stopping because such detent is larger and thus requires a positive force to move the throttle to stop position. This structure utilizes a conduit and wire structure connecting from the engine to the housing and the throttle lever. The components of the throttle control are readily assembled and secured in assembled position by a mounting bolt through the housing. The housing further includes a spring loaded means for retaining the housing and throttle components in assembled position.

An object of the present invention is to provide an improved throttle control for a small engine which is inexpensive, simple to make and assemble and which will maintain its set position even when subjected to vibration.

A further object of the present invention is to provide an improved small engine throttle control in which simple premolded plastic parts are releasably held in assembled position until installed with the a mounting bolt which retains the parts in assembled position.

Another object of the present invention is to provide an improved small engine throttle control which prevents inadvertent movement of the throttle lever to stop position when it is moved to the idle position.

BRIEF DESCRIPTION OF THE DRAWINGS

These and other objects and advantages of the present invention are hereinafter set forth and explained with respect to the drawings wherein:

FIG. 1 is a top plan view of a lawn mower having the improved throttle control of the present invention installed thereon.

FIG. 2 is a side elevation view of the present invention with the outer portion of the housing removed to illustrate the relationship between the throttle control and the main housing component.

FIG. 3 is a sectional view taken along line 3—3 in FIG. 2 to illustrate the means providing the releasable retention means for holding the two parts of the control housing in assembled position.

FIG. 4 is a partial sectional view taken along lines 4—4 in FIG. 2 to illustrate the edge connection of the two parts of the housing and their pivotal support of the throttle control.

DESCRIPTION OF THE PREFERRED EMBODIMENT

As shown in FIG. 1, the lawn mower 10 is provided with the usual wheels 12 supported from a housing 14 on which is mounted a small engine 16 and the handle 18 is suitably mounted to the rear of the housing 14. Throttle control 20 is secured to the handle by bolt 22 at a position which is easily reached by the operator. The control conduit 24 extends from the throttle control 20 to the engine 16 and control wire 26 extends through conduit 24 and is connected to the engine speed control 28.

Throttle control 20 includes housing 32 formed by housing sections 34 and 36 with section 34 being the base section in which is mounted the arcuate rack 38 having a series of uniform ridges 40 and an enlarged ridge 42 thereon. Ridge 42 prevents the lever 44 from being moved inadvertently to the stop position from the idle position as hereinafter explained. Each of the sections 34 and 36 includes projections 46 and 48, respectively, which engage in the recesses at the pivoting end of lever 44 as best shown in FIG. 4. Sections 34 and 36 are also recessed to allow lever 44 to project therefrom as shown in FIG. 2. Lever 44 includes arm 50 with detent 52 extending in the direction of rack 38. Arm 50 has sufficient resiliency so that detent 52 will move past enlarged ridge 42 and will move over ridges 40 allowing lever 44 to be positioned in a position causing engine 16 to run at the desired speed but will retain lever 44 in its set position during all normal operations.

Sections 34 and 36 include peripheral flanges 54 and 56 which have inter-engaging projections 58 and 60 as best seen in FIG. 4 to assure that they fit properly. Also, section 34 is provided with a boss 62 at the inner end of rack 38 having a square opening 64 therethrough. Section 36 includes fingers 66 projecting inwardly and adapted to pass through a square opening 64 in boss 62 with the fingers 66 having shoulders 68 on their outer ends which are adapted to engage spot fall 70 around opening 64 to provide the means for releasably retaining sections 34 and 36 in assembled position with lever 44 positioned therebetween. Also, fingers 66 are spaced apart a sufficient distance to allow bolt 22 to pass through when control 20 is being mounted in position.

Wire 26 is offset at its end and passes through opening 72 in lever 44. The end of conduit 24 within housing 14 has ferrule 74 secured thereon and flange 76 on ferrule 74 is positioned in slot 78 in section 34 as shown in FIG. 2. A portion of section 36 engages the side of conduit 24 above section 34 to retain conduit 24 and ferrule 74 in position.

As shown in FIG. 2, lever 44 is in stop position with the outer end of lever 44 being pulled back to its rearmost position. To move lever 44 to operating position, it is pushed forward until detent 52 has passed over enlarged ridge 42 and as far on rack 38 as needed to obtain the desired speed of engine 26. Movement of lever 44 to its forward position provides maximum operating engine speed. Movement of lever 44 back against the forward portion of ridge 42 is the idle position. Substantially greater force is needed to move lever 44 to the stop position and move detent 52 over ridge 42 than movement across ridges 40 because of the larger size of ridge 42. Wire 26 connects to a suitable mechanism for stopping engine 16 when lever 44 is in stop position, as by grounding the engine ignition system.

From this it can be seen that the improved small engine throttle control of the present invention provides an easily assembled premolded structure of plastic parts which is readily installed and which can accommodate any length of control conduit and wire with provision for an integral rack and spring detent to retain the throttle lever in its desired operating position and with an additional enlarged ridge on the ratchet to prevent inadvertent movement of the throttle control lever to the stop position when it is desired to be maintained at the idle position.

What is claimed is:

1. An engine throttle control comprising:
   a housing having two sections,
   one of said sections including a wall having an interior surface and an exterior surface with a peripheral flange being substantially perpendicular to the interior surface of said wall, a boss on the interior surface of the wall having an opening extending through the boss and the wall, said boss extending substantially perpendicular to the interior surface of the wall, an arcuate rack having ridges on one surface thereof extending from said wall, and a pivot projection extending from the wall,
   the other of said sections including a wall having an interior surface and an exterior surface with a peripheral flange being substantially perpendicular to the interior surface of the other section wall and adapted to engage the flange of said one section, a pair of spaced apart fingers having shoulders on their ends adapted, when said sections are assembled, to extend through the opening in said boss with said finger shoulders engaging the exterior surface of the wall of said one section to releasably retain said sections together, and a pivot projection extending from the other section wall and aligned with the pivot projection of said one section when said sections are assembled, and
   a control lever positioned partially between said assembled sections, extending therefrom and having recesses on opposite sides of one end thereof for receiving said pivot projections, an arm extending from said lever with a detent for engaging said arcuate rack to retain said control lever with a detent for engaging said arcuate rack to retain said control lever in its desired position until positively moved to another position.

2. An engine throttle control according to claim 1 wherein:
   said sections include means for releasably retaining a conduit therein and said throttle control lever includes means for releasably engaging a wire extending through said conduit into said housing.

3. An engine throttle control according to claim 1 including
   means on said rack for preventing inadvertent movement to stop position.

4. An engine throttle control according to claim 3 wherein said rack means includes
   an enlarged ridge on said rack between idle and stop position.

5. An engine throttle control according to claim 1 wherein
   said housing and said control lever are molded plastic parts.

6. An engine throttle control comprising
   a housing having a right-hand section and left-hand section,
   one of said sections having a primary wall with an interior surface and an exterior surface, a flange extending generally perpendicular to and from the outer periphery of the interior surface of said wall, a boss having an opening therethrough and through the wall and extending generally perpendicular to the interior surface of said wall, an arcuate ramp having teeth on one surface thereof, extending from said wall, a pivot pin extending from the interior surface of said wall, a conduit receiving boss surrounding an opening through a portion of said flange and having a slot therein,
   the other of said sections including a wall having an interior surface and an exterior surface with a flange extending generally perpendicular to and from the outer periphery of the interior surface of the wall and adapted to engage the flange of said one section, a pair of spaced-apart fingers having lips on their ends extending from the interior surface of said other section wall and when said sections are assembled said fingers extend through the opening in said one section wall boss with said lips engaging the exterior surface of the one section wall to retain said sections together, a pivot pin extending from the interior surface of said other section wall and aligned with the one section pivot pin when said sections are assembled, and a conduit engaging extension on a portion of the flange of said other section in position to retain a conduit in said opening,
   the inner ends of said flanges having overlapping engagement to ensure correct engagement of the sections on assembly,
   a conduit,
   a ferrule secured around one end of said conduit and having an outwardly extending flange to be received in the slot in said conduit receiving boss,
   a control wire extending through said conduit and having its ends offset for connection, and
   a control lever positioned partially between said sections and having a pivoting pin recess in opposite sides of one end thereof for receiving said section pivot pins, the opposite end of said lever extending beyond said sections, an opening in the intermediate portion of said lever to receive one end of said wire so that pivoting movement of said lever moves said wire, and a pawl extending form said lever and engaging said teeth on said arcuate ramp to retain said control lever in its position until positively moved to another position.

* * * * *